(12) United States Patent
Meyer et al.

(10) Patent No.: US 7,971,498 B2
(45) Date of Patent: Jul. 5, 2011

(54) CONTROL DEVICE

(75) Inventors: Joerg Meyer, Wagenfeld (DE); Andreas Giefer, Lemfoerde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 560 days.

(21) Appl. No.: 11/574,194

(22) PCT Filed: Aug. 23, 2005

(86) PCT No.: PCT/DE2005/001485
§ 371 (c)(1),
(2), (4) Date: Feb. 23, 2007

(87) PCT Pub. No.: WO2006/021198
PCT Pub. Date: Mar. 2, 2006

(65) Prior Publication Data
US 2009/0000407 A1    Jan. 1, 2009

(51) Int. Cl.
*F16H 35/18* (2006.01)
*F16H 59/04* (2006.01)
*B60K 17/04* (2006.01)
*B60K 17/12* (2006.01)
*B60K 20/00* (2006.01)
*H01H 19/00* (2006.01)

(52) U.S. Cl. ............ 74/10.41; 74/473.3; 74/473.12; 200/19.18

(58) Field of Classification Search ............ 74/10.1, 74/10.41, 10.8, 10.85, 473.3, 473.12, 425, 74/426, 112, 10.35; 200/179, 19.18, 19.19
See application file for complete search history.

(56) References Cited

U.S. PATENT DOCUMENTS

| | | | |
|---|---|---|---|
| 3,995,205 A | 11/1976 | Klees | |
| 4,367,805 A | 1/1983 | Totani et al. | |
| 4,378,474 A * | 3/1983 | Olson | 200/12 |
| 5,156,243 A * | 10/1992 | Aoki et al. | 192/218 |
| 6,404,354 B1 * | 6/2002 | Decker et al. | 341/35 |
| 6,564,661 B2 * | 5/2003 | DeJonge | 74/335 |
| 7,252,018 B2 * | 8/2007 | Hormann | 74/425 |
| 7,571,662 B2 * | 8/2009 | Pickering et al. | 74/473.3 |
| 2004/0162661 A1 * | 8/2004 | Kikuchi | 701/62 |

FOREIGN PATENT DOCUMENTS

| | | |
|---|---|---|
| DE | 42 05 875 A1 | 9/1993 |
| DE | 198 57 837 A1 | 6/2000 |
| EP | 0 961 305 A2 | 12/1999 |
| EP | 1 045 172 B1 | 10/2000 |
| EP | 1 229 272 A2 | 8/2002 |
| EP | 1 484 661 A1 | 12/2004 |
| JP | 08161071 | 6/1996 |

* cited by examiner

*Primary Examiner* — Justin Krause
(74) *Attorney, Agent, or Firm* — McGlew and Tuttle, P.C.

(57) ABSTRACT

A control device is provided for a technical system (17), e.g. for a shift-by-wire vehicle transmission. The control device includes a control (actuating) element, e.g. a rotary knob (1), with at least two shifting positions. The control element (1), itself, can rotate without limitation, whereas the control device has at least one stop device (2, 3), which can be adjusted in a controlled manner and which limits the angle of rotation (W) of the control element (1).

12 Claims, 6 Drawing Sheets

CONTROL DEVICE

CROSS REFERENCE TO RELATED APPLICATIONS

This application is a United States National Phase application of International Application PCT/DE2005/001485 and claims the benefit of priority under 35 U.S.C. §119 of German Patent Application DE 10 2004 041 087.9 filed Aug. 24, 2004, the entire contents of which are incorporated herein by reference.

FIELD OF THE INVENTION

The present invention pertains to a device for actuating or controlling a technical system, for example, for actuating the gears of a vehicle transmission and more particularly for a shift-by-wire vehicle transmission, the control device having an actuating element with at least two shift positions.

BACKGROUND OF THE INVENTION

Control device of the type mentioned in the introduction are used, for example, but by no means exclusively, in motor vehicles for actuating many different systems and functions of the motor vehicle. Numerous systems and functions are operated electrically and controlled electronically in modern motor vehicles. This applies both to complex mechanical assembly units of the powertrain, for example, for vehicle transmissions, and to simpler functions such as electric seat adjustment, windshield wiper drives, for various electronic devices in the vehicle and the like.

However, the electrical or electronic actuation of such systems, which makes do without mechanical connection, entails that there may sometimes not be an unambiguous assignment between the position of an actuating element and the state of the system that can be controlled by means of the actuating element, for example, a vehicle transmission. In other words, this means that the desired state of the system being controlled, for example, of the vehicle transmission, which state is selected with the actuating element, does not agree with the actual switching state of the system or the transmission.

Such a divergence between the states of a technical system and the control elements thereof may have various causes.

For example, erroneous or non-functioning recognition or detection of the position of the control element may occur, with the consequence that the gear, preselected, for example, by the driver with the control element, was not recognized by the system and the corresponding control command was not therefore sent to the transmission. Erroneous or non-functioning transmission of the control command between the control element and the system being controlled therewith is, for example, just as conceivable. However, the situation that technical systems, for example, vehicle transmissions, automatically adapt their operating or switching state to changed general conditions and change them without direct action on the part of the driver also occurs increasingly frequently in modern motor vehicles with the increasingly interconnected, complex technical systems used there. Thus, it is not uncommon, for example, that a vehicle transmission controlled by wire will automatically assume the shift position P (parking brake) when the engine is shut off and after the ignition key has been removed.

Another example, used only for illustration, is the comparatively simple case in which the system being controlled is the windshield washer/wiper unit of a vehicle. It is already known in this case as well that the windshield wiper will be turned on automatically, for example, in case of heavy fog or when precipitation begins, based on corresponding sensor signals. However, this means that the operating state of the windshield wiper will no longer possibly agree with the switching state of the control element for the windshield wiper.

The control element thus incorrectly signals, due to its unchanged position in the off position, that the windshield wiper is turned off, whereas it is actually in operation because of the automatic activation. Even if the actual operating position may be easily recognizable in case of the windshield wiper, at least the problem still remains that the actuating element is already in the off position when manual intervention with the automatic system of the windshield wiper is possibly desirable, i.e., to turn off the windshield wiper.

Resilient actuating elements, which automatically always return into a neutral middle position after the actuation, are used sometimes in the state of the art in case of such incompatibilities, or extremely complicated switching logics and corresponding displays, which have to display the instantaneous operating state of the system being controlled and shall also display the directions of motion of the actuating element necessary or possible for the control, are used at times.

The document EP 1 045 172 B1, in which it appears especially already from the figures that control concepts of such a design and form for technical systems in the motor vehicle cannot certainly be described as being intuitive or easy to understand, may be mentioned as an example hereof. Aside from the lack of control comfort of a man-machine interaction of such a design, such complicated control concepts can obviously also lead to undesired consequences in terms of the concentration of the driver on the actual driving action, and thus to problems with driving safety.

It is readily apparent that the cases are only examples of the more general problems of the interaction between man and machine in the case of electronically controlled systems, in which the control elements are in connection with the system to be controlled only via electric or electronic signals rather than via mechanical linkages or shafts.

SUMMARY OF THE INVENTION

Against this background, the object of the present invention is to provide a means for the electronic or generally by-wire actuation of a technical system, with which the drawbacks of the state of the art can be overcome. In particular, the control device shall make possible just as intuitive and easy-to-understand an actuation of the technical system as this has always been the case with mechanical or electromechanical actuating elements, for example, toggle switches. An immediate, intuitive and unambiguous feedback of the state of the system during the control of the corresponding actuating system shall also be an essential aspect.

The control device according to the present invention comprises, in the manner that is at first known per se, an actuating element with at least two switching positions, wherein the different switching positions correspond to respective different operating states of the technical system to be controlled. However, the control device according to the present invention is not limited to actuating elements with only two switching positions by any means, but it may have, in principle, any desired number of switching positions.

The control device is characterized according to the present invention in that the actuating element is rotatable in itself and that the control device has at least one stop means that is adjustable in a controlled manner. The stop means is used for the variable limitation of the angle of rotation of the actuating element as a function of the state of the technical system being controlled.

In other words, this means at first that the actuating element has no defined initial and end positions for the time being. The initial and/or end positions of the actuating element are rather set dynamically by means of the adjustable stop means, specifically as a function of the actual, instantaneous state of the technical system being controlled.

The principle of action shall be illustrated at first again with the simple example of the actuation of the windshield wiper. The windshield wiper unit comprises in this example an actuating element, which is unlimitedly rotatable, for example, an essentially round turning knob. It is signaled by means of corresponding symbols on the turning knob or in the area surrounding same that the windshield wiper is turned on by turning the turning knob to the right and is again turned off by turning the turning knob to the left. This simple principle of operation is immediately understandable and will be internalized by the driver of the motor vehicle in a very short time.

The windshield wiper is assumed to be turned off at first. The stop means adjustable according to the present invention for the turning knob is then set in the turned-off state of the windshield wiper by the electronic or electromechanical system of the control device such that the turning knob is mechanically at its left-hand stop (corresponding to the "off" position) and thus it can be turned by the driver to the right only.

To turn on the windshield wiper, the turning knob is thus turned simply to the right until the rotary motion of the turning knob is again limited by the right-hand stop (corresponding to the "on" position). The driver thus knows intuitively after a few actuating operations that a turning knob turned to the right to the "on" stop corresponds to a turned-on windshield wiper and a turning knob turned to the "off" stop corresponds to a turned-off windshield wiper. This type of actuation corresponds, in principle, to the extremely widespread, simple principle of the toggle switch, which has been encountered since time immemorial in numerous devices, beginning from electric household appliances to usual switches on the motor vehicle and to safety-relevant switching means, for example, in power plants.

When—in this example of the actuation of the windshield wiper—the windshield wiper is turned on automatically because of beginning precipitation thanks to a rain sensor present on the vehicle, the agreement between the switching position of the actuating element and the operating state of the technical system being controlled, consequently the windshield wiper here, would be abolished in a conventional actuating element. If the driver wanted to intervene in the automatic actuation of the windshield wiper and turn it off again manually, he could not turn the windshield wiper turning knob simply intuitively to the left to the "off" stop, because the turning knob would already be at the left-hand "off" stop without any change. Thus, a separate possibility should be created for the intervention in the automatic system, which would either make necessary, for example, an additional actuating knob, or make it impossible to use an actuating element with discrete switching positions. Both would be detrimental to ergonomics and make impossible the desired intuitive operation of the system.

This is where the present invention comes in, in which the stop or the two end stops of the turning knob can be varied as a function of the actual instantaneous operating state of the system to be controlled. In other words, this means in this example—in the case of the automatic activation of the windshield wiper—that the control device automatically adjusts the mechanical end stops of the turning knob by means of a suitable electromechanical system such that the turning knob cannot now be turned to the right any longer. Rather, only a motion of the turning knob to the left can take place, even though the turning knob was still at the left-hand stop and consequently in the off position shortly before.

For the driver, this means that, without further thinking and without consulting a complicated display means, he can reach, as always, simply for the turning knob and simply turn it to the left to the "off" stop, as he would usually do to turn off the windshield wiper. It is immediately apparent from this that such an intuitive operation of technical systems is advantageously favorable for the operating comfort and also offers an effective protection against potential safety risks that could result from excessively complicated control elements or control concepts.

The concrete shape of the actuating element is at first irrelevant for the embodiment of the present invention as long as handy and safe operation of the actuating element is possible regardless of the rotation position thereof. However, the actuating element preferably has an essentially rotationally symmetrical design and especially no angle-specific shape or color identification. It is avoided as a result that the operator or the driver in the case of a vehicle will erroneously identify a certain angle of rotation position of the actuating element with a certain state of the system to be controlled.

According to a preferred embodiment of the present invention, the actuating element has a number of stop positions, which are especially preferably distributed uniformly over a full revolution of the actuating element, i.e., over 360 degrees. It was found that actuating elements with defined stop positions are preferred by the majority of operators, because there is a defined tactile feedback on the switching operation due to the stop positions which can be felt during the actuation. This applies especially to control device that comprise more than two switching positions, and in which the system to be controlled can correspondingly assume more than two different operating states.

The present is also embodied independently from the concrete embodiment of the stop means, as long as the particular desired angle of rotation limitation of the actuating element can be embodied with it. According to a preferred embodiment of the present invention, the stop means has a stop each for both directions of rotation of the actuating element, and the two stops are especially preferably connected to one another, for example, made in one piece. An angle of rotation limitation can thus be embodied in a simple manner for both directions of rotation of the actuating element in a simple manner and reliably, the remaining angle of rotation range between the two end stops being constant in this embodiment of the present invention, i.e., the actuating element can always be moved within an angle range of equal size.

According to an alternative embodiment of the present invention, the two end stops of the stop means or the two stops for the actuating element can be controlled and adjusted separately from one another. In addition to the claimed angle adjustment of the entire angle of rotation range, it is thus also possible to change the size of the permissible angle of rotation range as a function of the operating state of the technical system to be controlled. For example, the possible angle of rotation of an actuating element for a motor vehicle transmission could thus be reduced as a function of the instantaneous rate of speed to the gears that are indeed allowed to be engaged without endangering driving safety and without the risk of damage to the powertrain.

The manner in which the stop means for the actuating element is driven is, furthermore, also nonessential for the present invention. According to a preferred embodiment of the present invention, the drive of the stop means does, however, comprise a worm gear. A worm gear is advantageous here, because it can be designed as a self-locking worm gear without additional auxiliary means and it can thus effectively assume the function of a fixed stop for the actuating element.

According to an alternative embodiment, the stop means is driven via a spur gear. To assume the stop function for the actuating element, the drive additionally comprises, according to this embodiment, a regulating means for generating the necessary opposing torque by means of a motor.

According to another possible embodiment of the present invention, the stop means itself is formed by a gear motor acting directly on the actuating element, and the control of the gear motor in turn comprises a regulating means for generating the necessary opposing torque by means of a motor to assume the stop function. This embodiment is advantageous insofar as it can have an especially simple mechanical design and, in particular, no longer requires any separate mechanical stops.

Moreover, it is thus even conceivable, in certain system constellations, to change automatically not only the position or the distance of the (now virtual) stops, but also the position of the actuating elements themselves. For example, the actuating element could thus also assume at the same time the function of a mechanical operation display, and it would be possible to use actuating elements that are not rotationally symmetrical, especially conventional toggle switches and the like, even in systems that can be influenced automatically.

Provisions are made according to other embodiments of the present invention for the control device to be connected to a display means, for example, to a display means in the area of the instrument panel, or for the control device itself to comprise a display means, which may be arranged, for example, in the immediate area of the actuating element. The embodiments with a display means of their own are advantageous especially in case of the actuation of such technical systems whose operating state is not immediately recognizable, contrary to the windshield wiper mentioned as an example in the introduction. The display means is used in this case, for example, to signal the current switching or operating state of the transmission in the immediate area of the actuating element, for example, in the area of a turning knob for controlling a motor vehicle transmission.

Provisions are made here, according to another, preferred embodiment of the present invention, for the display means to have a discrete, i.e., separate display element, which is arranged separately in space, for each switching position, the distances between the discrete display elements especially corresponding to the angle difference between the switching positions or stop positions of the actuating element.

In other words, this means that one separate display element, for example, a light-emitting diode or the like, corresponds exactly to each selectable switching position or stop position of the actuating element, the distance between the individual display elements or luminous fields agreeing with the angle differences between the switching positions of the actuating element.

Together with the adjustable end stops according to the present invention, the function and the mode of operation of the conventional toggle switch, in which a defined operating state of the switched system or of the system being controlled is exactly assigned to each switching position, and in which there are both optically and mechanically defined end positions or end stops in both directions of rotation, is thus simulated. However, the claimed principle of the adjustable end stops, whose position can be adapted as a function of the actual, possibly spontaneously changed state of the system in order to guarantee the possibility of intuitive operation, as described, in all states of the system, is, of course, retained at the same time.

According to another embodiment of the present invention, the control device comprises, furthermore, a controllable blocking means for blocking the rotary mobility of the actuating elements. The blocking means is preferably designed such that the rotary mobility of the actuating element is completely blocked, for example, in the non-energized state of the system. The operator or the driver of a motor vehicle can thus immediately and intuitively recognize that the system or the vehicle transmission to be controlled cannot be influenced by means of the actuating element any longer.

According to another embodiment of the present invention, the control device comprises, furthermore, a mechanical release mechanism. This is available as a so-called override function for the case of malfunctions of the drives of the stop means and/or the drive of the blocking means and makes it then possible by means of a mechanical release of the stop means and/or the blocking means to nevertheless confirm the actuating element in the sense of an emergency operation.

The present invention will be explained in greater detail below on the basis of exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
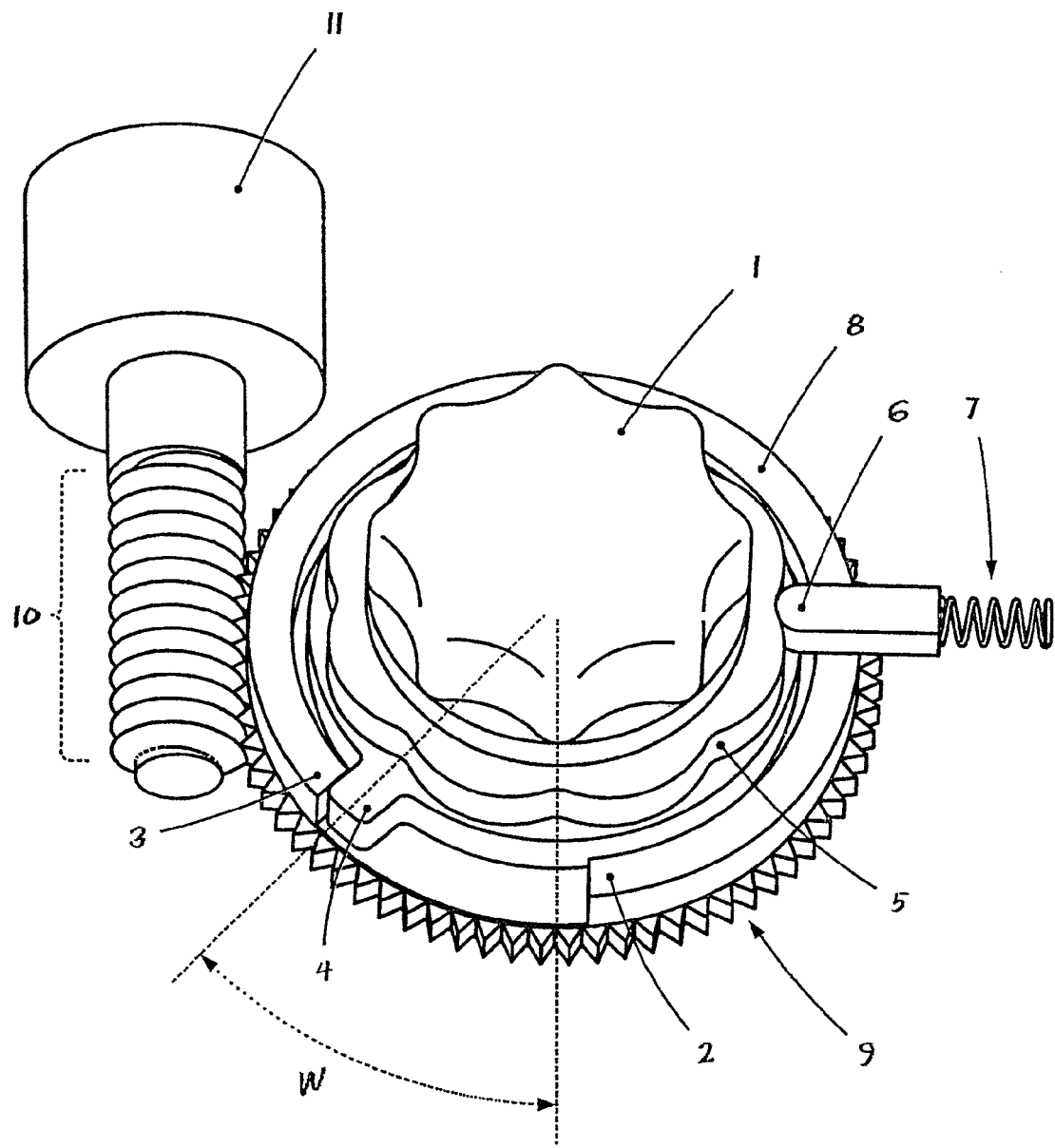
FIG. 1 is a schematic isometric view of the actuating element and the stop means of a control device according to the present invention.

Referring to the drawings in particular, FIG. 1 shows a schematic isometric view of the actuating element 1 and the stop means 2, 3 of a control device according to the present invention.

The actuating element, which is designed as a rotationally symmetrical turning knob 1 with recessed grip for the fingers and is used to control a technical system, not shown, is recognized at first. It shall be assumed for the sake of simple illustration only that the turning knob 1 being shown shall be used to switch a windshield wiper on and off.

The turning knob 1 is connected in one piece to a locking contour 5 extending circumferentially in an annular pattern, on which a spring-loaded locking piece 6 slides. The locking piece 6 and the compression spring 7 are arranged in a corresponding recess in the housing of the control device, which said housing is not being shown here. The locking contour 5 ensures a perceptible snapping in of the turning knob 1, in the sense of the ergonomics of the control device, during the manual actuation. The stop cam 4, which can be moved to and from in the area between the two stops 2 and 3, i.e., within the angle range W, is likewise connected to the turning knob 1 in one piece.

The two stops 2 and 3 are formed by a bead 8, which extends circumferentially in an annular pattern, is correspondingly recessed in the angle range W and is itself made in one piece with the toothed ring 9. The toothed ring 9 meshes with the worm gear 10 of an electric motor drive 11 such that the toothed ring 9 and the stops 2, 3 can be rotated round the turning knob 1 by means of the electric motor drive 11 and thus can be brought into any desired angular position. Due to the stop cam 4 being connected to the turning knob 1, the turning knob 1 can then always be turned to and from between the two stops 2 only within the particular angle range W set.

Figure 2:
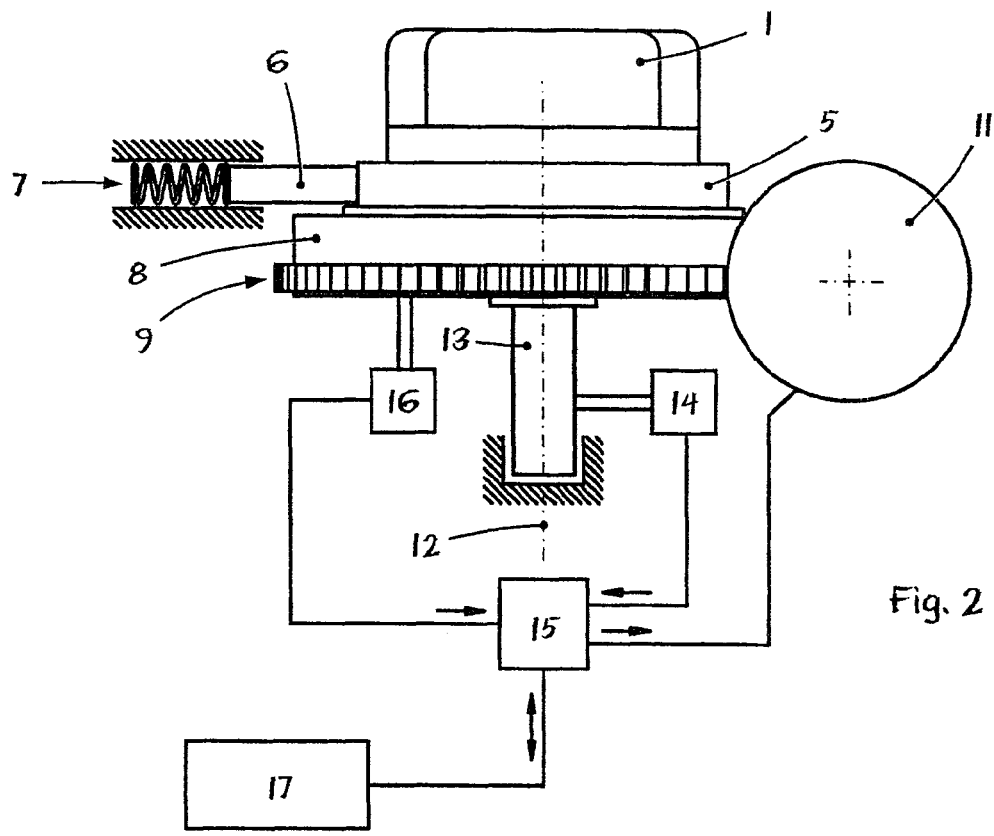
FIG. 2 is a schematic lateral view of the control device according to FIG. 1.
Figure 3:
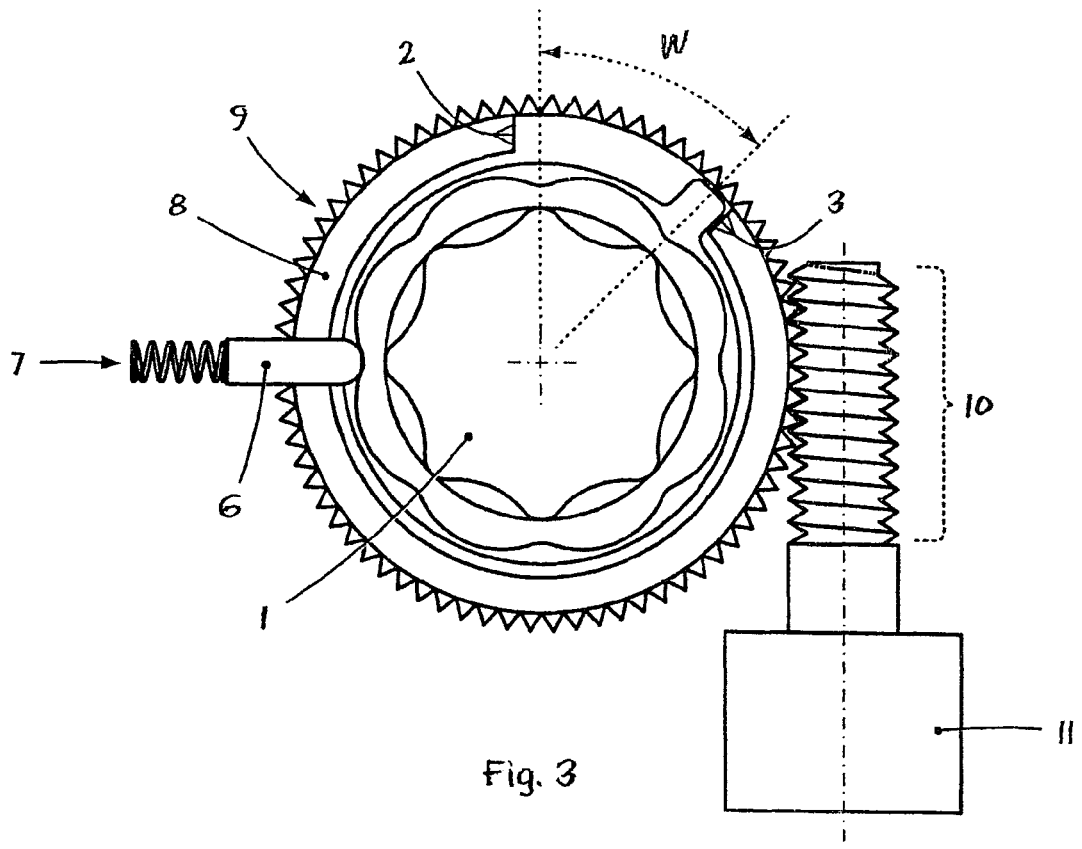
FIG. 3 is a top view of the control device according to FIGS. 1 and 2 in a view corresponding to FIG. 2.

FIG. 2 shows a schematic lateral view of the control device according to FIG. 1, including the switching logic as well as in connection with the technical system to be controlled. FIG. 3 shows the corresponding top view.

The turning knob 1 and the locking contour 5, on which the locking piece 6 loaded with the compression spring 7 acts, as well as the toothed ring 9 and the annular bead 8, which is made in one piece with the toothed ring and whose recess forms the two stops 2 and 3 in the angle range W, are again recognized at first. The toothed ring 9 and the annular bead 8 can be brought into any desired angular position about the common axis of rotation 12 of the turning knob 1 and the toothed ring 9 or the annular bead 8 by means of the electric drive 11.

The angular position of the shaft 13, which is connected to the turning knob 1 in such a way that they rotate in unison, is determined by means of an angle of rotation sensor 14 and reported to an electronic control unit 15. Another angle of rotation sensor 16 always determines the instantaneous angular positions of the two stops 2 and 3 and likewise reports these to the electronic control unit 15. The electronic control unit 15 is, furthermore, in connection with the system 17 to be controlled, which is in the form of the windshield wiper 17 in this explanatory example. Finally, the electronic control unit 15 is also connected via another line to the electric drive 11, with which the toothed ring and the stops 2, 3 can be rotated into the necessary angular position.

The principle function of the control device according to the present invention shall be explained below on the basis of FIGS. 4 through 6.

Figure 4:
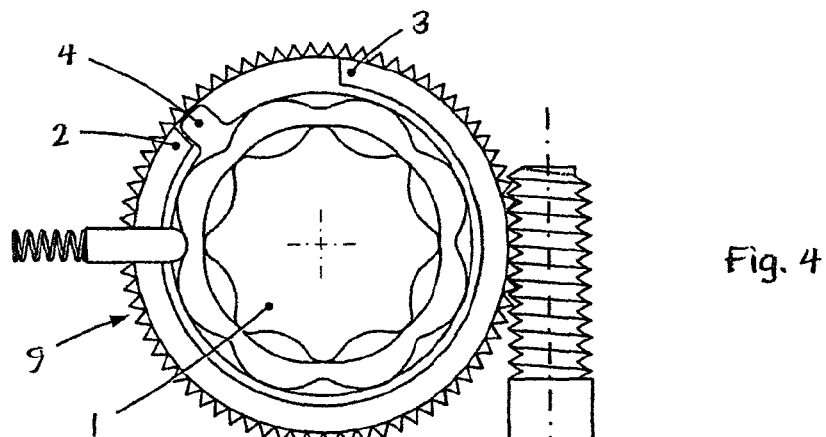
FIG. 4 is a layout and view of the control device according to FIGS. 1 through 3 in a view corresponding to FIG. 1 in a first relative position.

The system to be controlled, i.e., the windshield wiper 17 (cf. FIG. 2) in this example, shall be turned off in the state according to FIG. 4. Because of the stop cam 4 being connected in one piece to the turning knob 1, the turning knob 1 is mechanically at its left-hand stop 2, corresponding to the "off" position of the windshield wiper 17. The windshield wiper 17 shall now be turned on manually by the operator or driver. The windshield wiper 17 is turned on manually by turning the turning knob 1 to the right until the stop cam 4 comes into contact with the right-hand stop 3, corresponding to the "on" position, cf. FIG. 5. The motion of the turning knob 1 is reported now to the electronic control unit 15 via the sensor 14 according to the view in FIG. 2. The electronic control unit 15 then turns on the windshield wiper motor 17.

Figure 5:
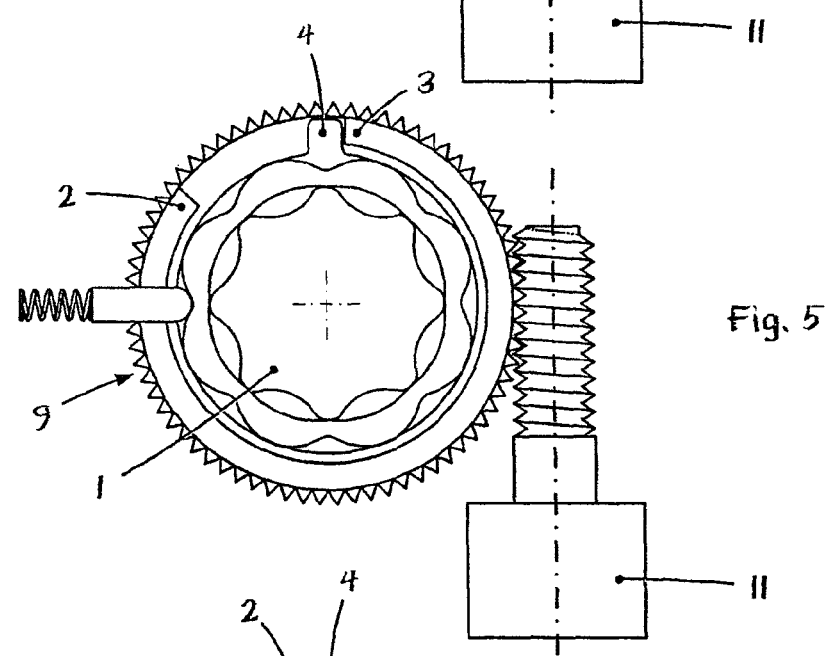
FIG. 5 is a layout and view of the control device according to FIGS. 1 through 4 in a view corresponding to FIGS. 3 and 4 in a second relative position.

The situation according to FIG. 5 arises, the turning knob 1 is in the "on" position, and the windshield wiper is running. If, for example, the vehicle is stopped in the further course and the driver leaves the vehicle, the windshield wiper is first stopped in the manner known per se, just as most other electric loads. After the driver returns to the vehicle, the windshield wiper would, however, normally start working again after the vehicle is started, because the actuating knob 1 of the windshield wiper would continue to be in the "on" position. However, this is usually undesirable, because the weather situation will often have changed in the meantime, and since a windshield wiper that surprisingly starts working when driving away may, moreover, represent a safety problem for the driver.

For example, the turning off of the engine and/or the fact that the driver left the vehicle could, however, be recorded if a control device according to the present invention is present. To prevent the windshield wiper from unexpectedly starting working at the next start of the vehicle, the electronic control unit 15 therefore turns off the windshield wiper motor 17 completely. However, the turning knob 1 now remains in the mechanical "on" position at the right-hand stop 3, as before. In the case of a conventional control device with discrete switching positions, the driver therefore could not turn the windshield wiper on again, which was automatically stopped in the meantime, in the usual manner by turning the turning knob 1 to the right, because the turning knob 1 would continue to be at the right-hand stop 3 and consequently already in the mechanical "on" position.

This problem is solved according to the present invention by the electronic control unit 15 also rotating the toothed ring 9 with the stops 2, 3 connected thereto clockwise simultaneously with or subsequent to the automatic stopping of the windshield wiper 17 just to the extent that the turning knob 1 will not be subsequently at the right-hand stop 3 any longer, but rather again at the left-hand stop 2, without, however, any change whatsoever in the absolute position of the turning knob 1.

Figure 6:
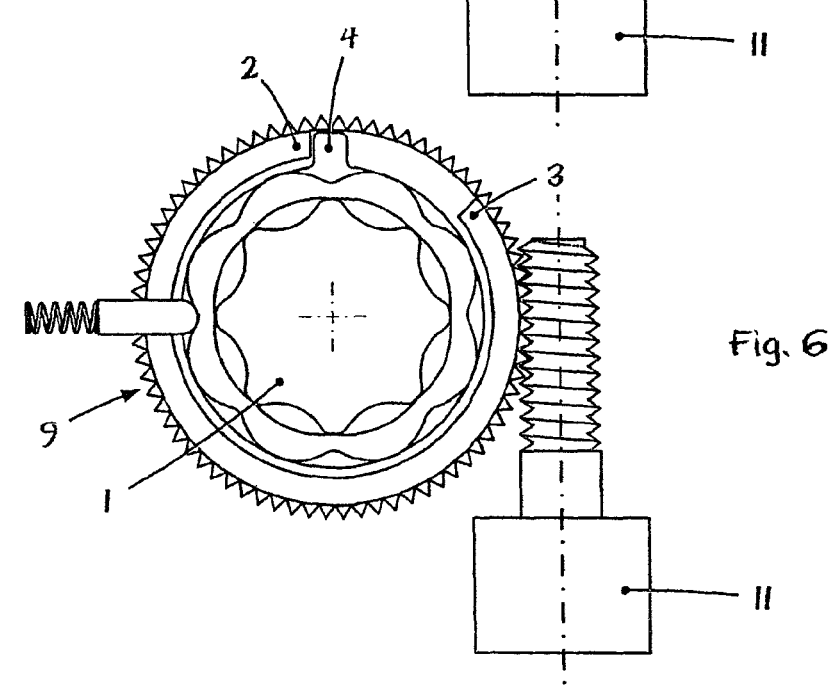
FIG. 6 is a layout and view of the control device according to FIGS. 1 through 5 in a view corresponding to FIGS. 3 through 5 in a third relative position.

Thus, the situation according to FIG. 6 will now become established: The windshield wiper motor 17 was turned off (automatically), and the turning knob 1 is in the mechanically correct "off" position at the left-hand stop 3. The following situation, which is intuitively immediately comprehensible to the driver, will arise: "The windshield wiper is off; it can be turned on, as always, by turning the knob to the right."

Figure 7:
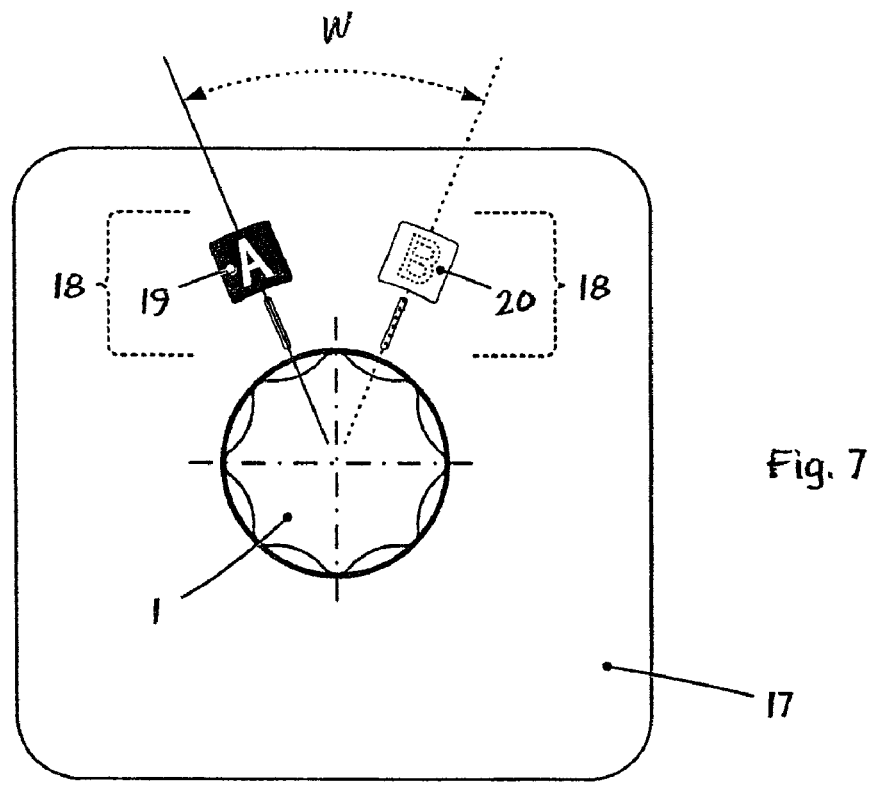
FIG. 7 is a schematic top view of the control device according to FIGS. 1 through 6 in a first switching position.
Figure 8:
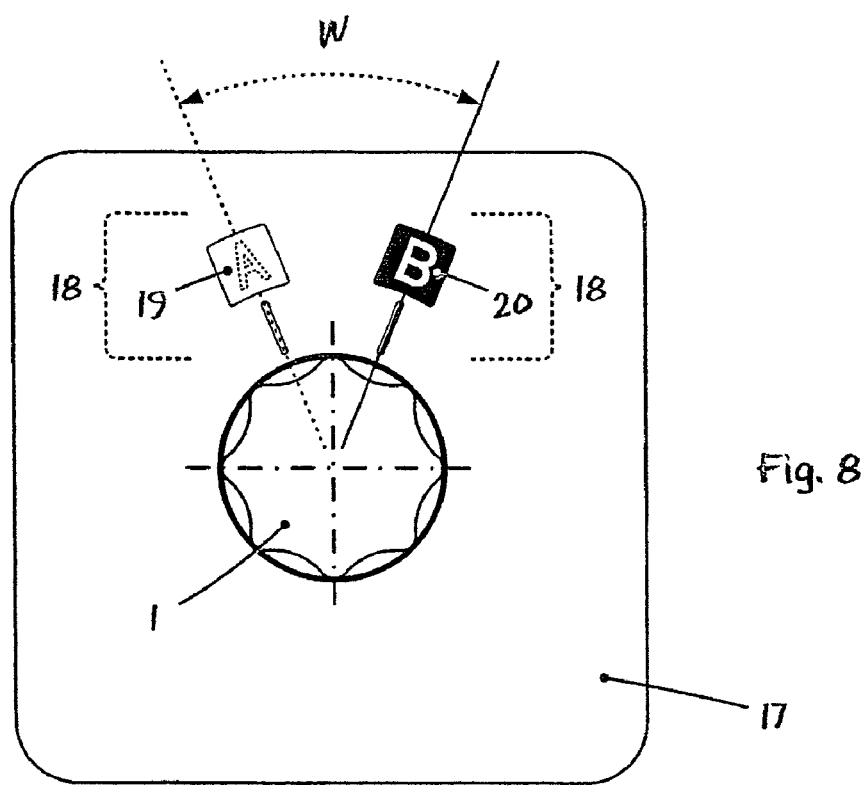
FIG. 8 is a layout and view of the control device according to FIGS. 1 through 7 in a view corresponding to FIG. 7 in a second switching position.

FIGS. 7 and 8 show a control device with a turning knob 1 analogous to that in FIGS. 1 through 6, but the control device according to FIGS. 7 and 8 is provided with a cover 17 and has, moreover, a means for displaying the particular switching state. The display means 18 comprises two discrete display elements 19, 20 in this exemplary embodiment.

Thanks to the display means 18, in conjunction with the properties of the control device according to the present invention, which are explained in FIGS. 1 through 6, even the reliable, intuitive logic and the possibility of easy operation of the conventional toggle switch, which operation is immediately understandable under all conditions, are simulated as completely as conceivable, because, in addition to the end stops 2, 3 for the turning knob 1 (covered by the cover 17 in FIGS. 7 and 8), which said end stops are adjustable by means of the electronic control unit 15 and the drive 9, 10, 11, the actual instantaneous switching position of the turning knob 1 and of the system 17 being controlled therewith is also signaled visually unambiguously by the display means 18 with the display elements 19 and 20 which are discrete in space.

Extrapolated to the example of the actuation of a windshield wiper, which example was selected for the sake of illustration, this means in reference to FIGS. 7 and 8 that the windshield wiper can be turned on and off by turning intuitively to the right and left with the turning knob 1, and the switching state of the windshield wiper is signaled both by the locking mechanism 5, 6 and the end stops 2, 3 in a tactile manner, but additionally also by the visual display means 18, 19, 20. Thus, the windshield wiper is turned off in FIG. 7, the turning knob 1 is mechanically at the left-hand stop (stop 2 according to FIGS. 1 through 6), and the display element 19 is activated, for example, illuminated by means of a light-emitting diode.

If the windshield wiper is now activated automatically, for example, when it starts raining, by means of a rain sensor, the control device 15 changes the situation at the turning knob 1 likewise automatically such that the situation according to FIG. 8 is now present. The display element 20 is now activated and thus visualizes the windshield wiper, which is now in operation. In addition, the two end stops 2, 3 of the turning knob 1 were additionally also adjusted by the control device 15 (cf. FIGS. 2 and 3) such that the turning knob 1 is now correctly at the right-hand mechanical stop, but without the absolute position of the turning knob 1 having changed.

In other words, this means that the driver can also turn off the automatically activated windshield wiper in the usual manner manually by rotating the turning knob 1 to the left. The display means 18 now changes over the activation of the display elements 19 and 20 such that the display element 19 is again activated after the windshield wiper has been turned off manually, so that the situation according to FIG. 7 will again become established. The position of the stops 2 and 3 remains unchanged during this manual actuation of the turning knob 1.

Figure 9:
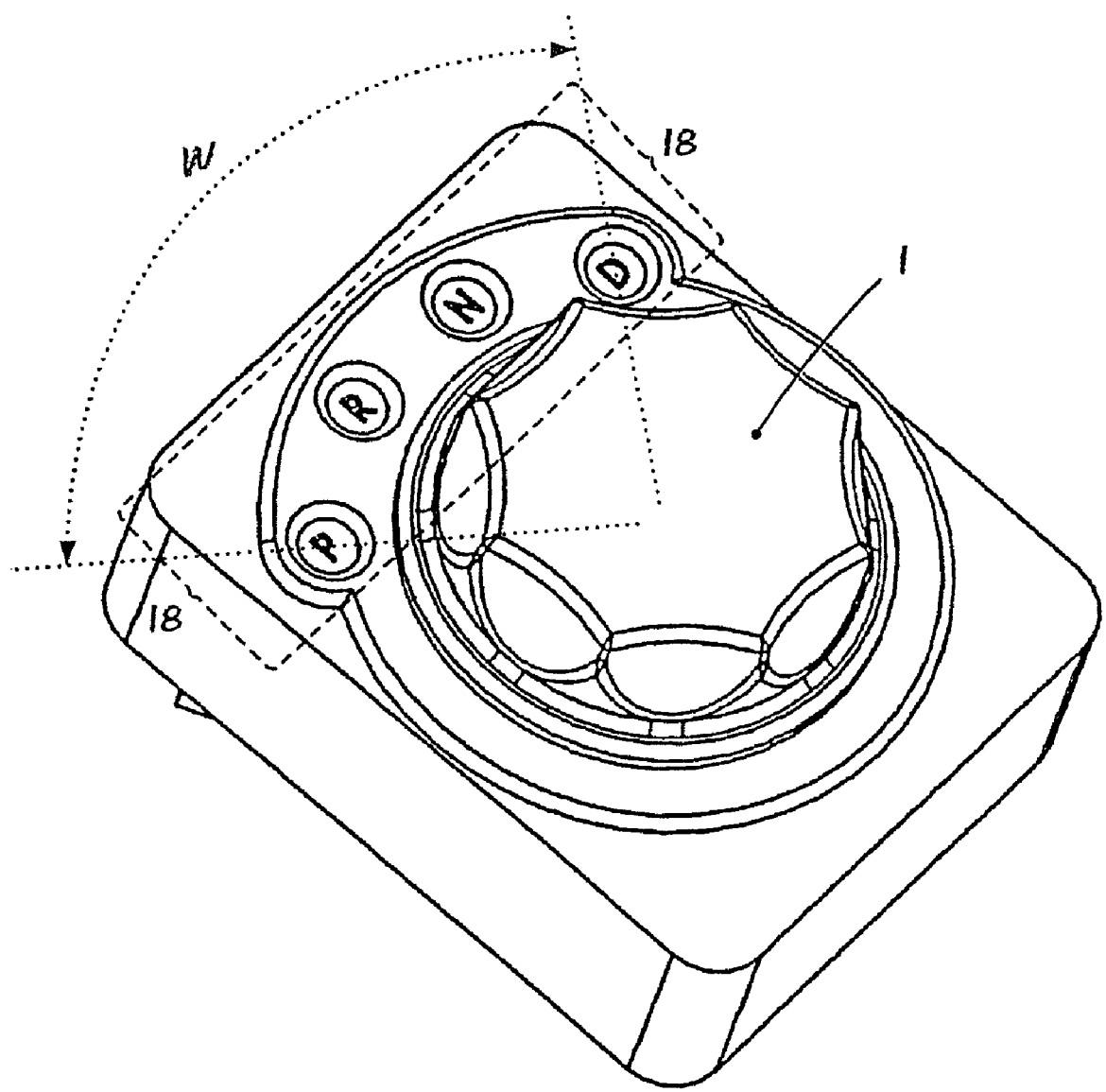
FIG. 9 is an isometric view of another embodiment of a control device according to the present invention.

FIG. 9 shows an isometric view of another embodiment of a control device according to the present invention. The control device according to FIG. 9 is used to control a gear box capable of being shifted by wire, for example, the automatic transmission of a motor vehicle. It is recognized right away that, unlike the control device according to FIGS. 1 through 8, the control device according to FIG. 9 has not only two shift positions, but four. The shift positions of the control device according to FIG. 9 are designated in the usual manner by P (parking brake), R (reverse), N (neutral position, idle), and D (drive position).

Situations in which not only the currently engaged gear is changed automatically, but in which even the higher-level switching state of the transmission itself is rather changed, i.e., in which the transmission control device automatically engages, for example, one of the shift positions P, R, N, D, also occur in motor vehicle transmissions, especially in automated gear boxes. It is thus possible, for example, that a gear box capable of shift-by-wire shifting will automatically engage the position P (parking brake) whenever the ignition key is removed, or when the driver leaves the vehicle, in order to thus prevent the risk of the motor vehicle rolling away.

However, the actuating element of the vehicle transmission or an existing transmission gearshift lever would continue to be in the position selected last by the driver (for example, "Neutral") in such a case, whereas the transmission would, in fact, be in the automatically engaged "Parking brake" position.

Both the end stops 2, 3 for the turning knob 1 and the display 18 of the currently, actually engaged gear are now automatically adapted in such a case in the control device according to FIG. 9. Since the turning knob 1 itself has no shape or color identifications, from which the switching state of the transmission could be inferred, this adaptation of the control device can take place without the position of the turning knob 1 itself having to the changed. Yet, the turning knob 1 is mechanically correctly at its left-hand end stop 2 subsequent to the automatic adaptation of the control device by the control device 15, and the actually occurring switching state of the transmission is displayed correctly by the lighting up of the left-hand display element "P."

No divergence develops between the actual state of the system and the state of the control device even in the case of the example of an improper operation (the driver selects, for example, gear "R" while the vehicles has not yet come to a stop). If the driver turns the turning knob 1 in such a case from position "D" to position "P" in such a case, for example, while driving, this shifting operation is not carried out by the transmission. The transmission rather remains in gear "D," instead, and this is also displayed by the display means 18. Only the positions of the two mechanical end stops 2, 3 are adapted in such a case by the control device 15 such that the turning knob will again be at its right-hand stop (in gear "D") even after the incorrect actuation.

Figure 10:
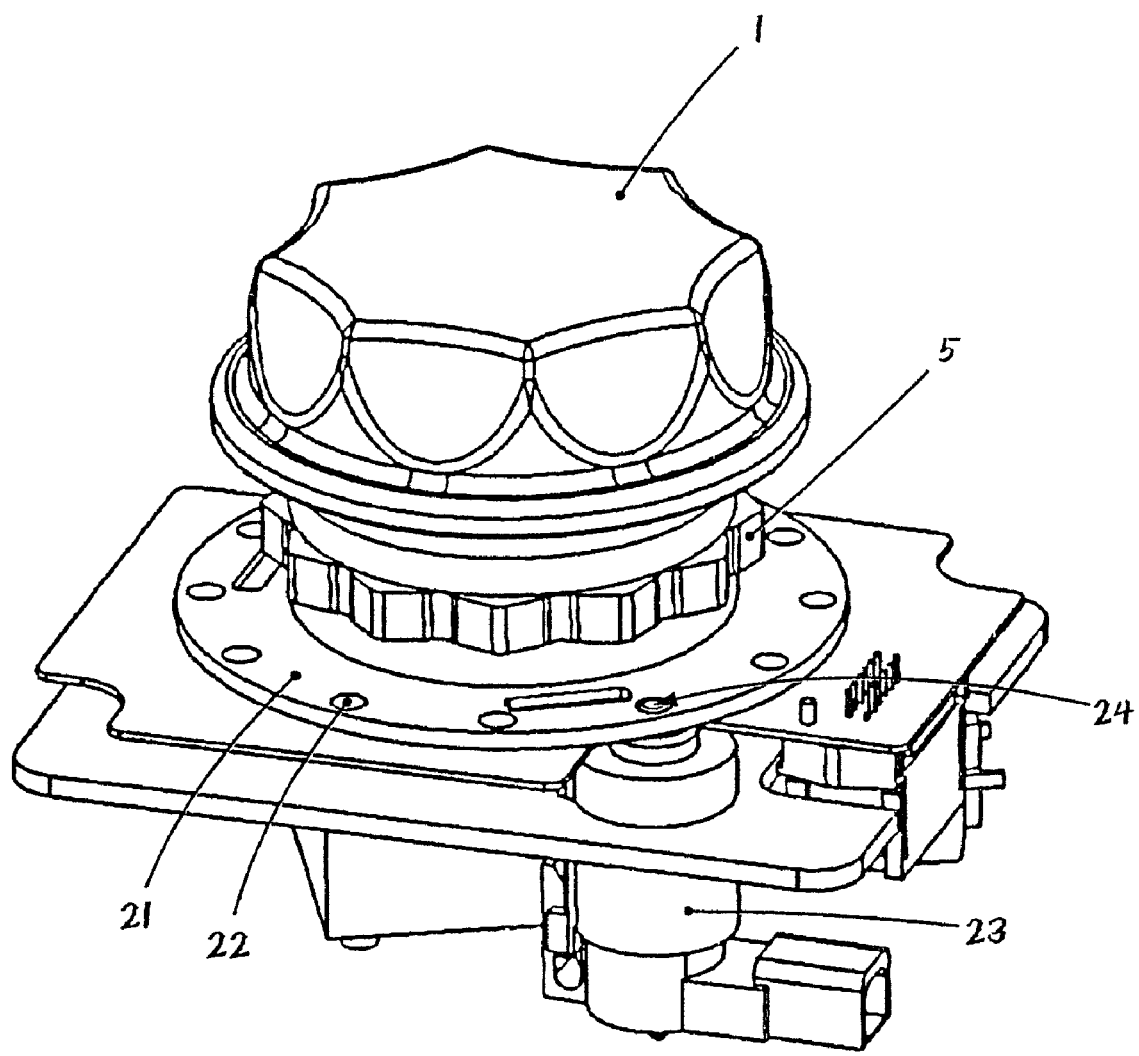
FIG. 10 is a view of the control device according to FIG. 9 in a view corresponding to FIG. 9 with, among other things, the housing removed.

Finally, FIG. 10 shows the control device according to FIG. 9, but, e.g., the housing of the control device has been removed in the view in FIG. 10. It is seen that the locking contour of the control device according to FIGS. 8 and 10 divides the rotation of the turning knob 1 over the entire angle of rotation of 360 into a number of uniform locking positions. The locking contour 5 of the control device according to FIGS. 9 and 10 has 12 locking positions here, and the end stops 2, 3 (not shown in FIGS. 9 and 10) limit the actually possible rotary motion of the turning knob 1 to the angle range W, analogously to the views in FIGS. 1 through 6, and thus they permit only the selection of the four shift positions P, R, N and D located next to each other.

FIG. 10 also shows, besides the actuating knob 1 and the locking contour 5, that the control device according to FIGS. 9 and 10 comprises an additional locking disk 21, the locking disk 21 being connected to the locking contour 5 and to the turning knob 1 in such a way that they rotate in unison. The locking disk 21 has a number of holes 22, which are arranged distributed along its circumference. The control device comprises, furthermore, a locking magnet 23 with a locking pin 24, the locking pin 24 being able to engage one of the holes 22 and thus block the actuation of the turning knob 1.

The locking magnet 23 and the locking pin 24 are set up such that the locking pin 24 blocks the turning knob 1 in the currentless state of the locking magnet 23, for example, in order to signal to the driver that shift commands cannot currently be passed on into the vehicle transmission, e.g., because of failure of a circuit. Other examples of the use of the locking magnet are, in an automatic vehicle transmission, the shift positions "P" and "N," from which shifting is possible for safety reasons only when the brake pedal is depressed.

It thus becomes clear as a result that thanks to the present invention, a control device is created for electrically or electronically controlled technical systems, which makes possible just as an intuitive, safe, easy-to-understand and error-free actuation of the technical system as is possible, for example, with mechanical actuating elements having discrete locking positions. At the same time, an unambiguous, intuitively understandable, especially tactile feedback on the state of the system is achieved thanks to the present invention.

Thus, the present invention makes an essential contribution to the improvement of the ergonomics, safety and operation of complex technical systems, especially in the concrete application of the operation of diverse technical systems on the motor vehicle.

While specific embodiments of the invention have been shown and described in detail to illustrate the application of the principles of the invention, it will be understood that the invention may be embodied otherwise without departing from such principles.

The invention claimed is:

1. A control device for a technical system, the control device comprising:
    an actuating element with at least two actuation positions, said actuating element being unlimitedly rotatable;
    a stop means adjustable in a controlled manner for limiting the angle of rotation of said actuating element;
    an electronic control unit for receiving an actuation signal based on a change in actuation position or angular position of said actuating element, wherein said stop means includes a drive for establishing and changing said actuation positions, said electronic control unit being connected to said stop means for controlling the establishment and change in said actuation positions; and
    a system to be controlled, said electronic control unit being connected to said system to be controlled for changing a state of said system based on said actuation signal and for changing said actuation positions based on an automatic change to a state of said system, said actuation positions being defined by a first stop portion and a second stop portion, said first stop portion and said second stop portion limiting a movement range of said actuating element, said first stop portion and said second stop portion being movable by said drive or said actuation positions being defined by said drive limiting a movement range of said actuating element, said stop means sending a stop position signal to said electronic control unit.

2. A control device in accordance with claim 1, wherein said actuating element is essentially rotationally symmetrical.

3. A control device in accordance with claim 1, wherein said actuating element has a plurality of stop positions.

4. A control device in accordance with claim 1, wherein said first stop portion defines a stop for one direction of rotation and said second stop portion defines a stop for another direction of rotation.

5. A control device in accordance with claim 4, wherein two said first portion and said second portion are connected to one another.

6. A control device in accordance with claim 1, further comprising a worm gear wherein the drive of the stop means comprises said worm gear.

7. A control device in accordance with claim 1, further comprising spur gear wherein said stop means is driven via said spur gear as a drive, said drive comprising a regulating means for generating an opposing torque.

8. A control device in accordance with claim 1, in combination with a separate display means.

9. A control device in accordance with claim 1, further comprising: a display means.

10. A control device in accordance with claim 9, wherein the display means has a discrete display element for each switching position.

11. A control device in accordance with claim 10, wherein said actuating element is a turning knob and the distances between the discrete display elements correspond to the angle differences between the actuation positions of the turning knob.

12. A control device comprising:
    an actuating element mounted for rotation into a plurality of rotational positions;
    a stop means for changing an angular position of stop positions in a controlled manner such that the angle of rotation of said actuating element is limited between said stop positions;
    an electronic control unit for receiving an actuation signal based on a change in actuation position or angular position change of said actuating element, wherein said stop means includes a drive for establishing and changing said stop positions, said electronic control unit being connected to said stop means for controlling the establishment and change in said stop positions; and
    a system to be controlled, said electronic control unit being connected to said system to be controlled for changing a state of said system based on said actuation signal and for changing said stop positions based on an automatic change to a state of said system, said stop positions being defined by first and second stop portions limiting a movement range of said actuating element, said stop portions being movable by said drive or said stop positions being defined by said drive limiting a movement range of said actuating element, said stop means sending a stop position signal to said electronic control unit.

* * * * *